Feb. 26, 1963 LE ROY S. JIMERSON, JR., ETAL 3,078,725
ACCELERATION MEASURING MEANS
Filed Dec. 31, 1959 2 Sheets-Sheet 1

FIG. I

INVENTORS
LEROY S. JIMERSON
ROBERT A. WATSON
BY
ATTORNEYS

Feb. 26, 1963   LE ROY S. JIMERSON, JR., ETAL   3,078,725
ACCELERATION MEASURING MEANS
Filed Dec. 31, 1959   2 Sheets-Sheet 2
FIG. 2
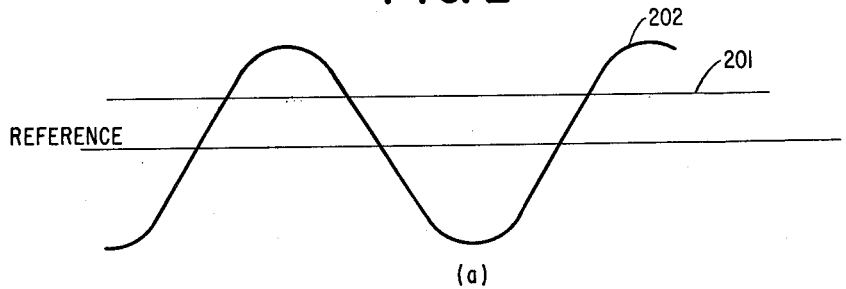
(a)
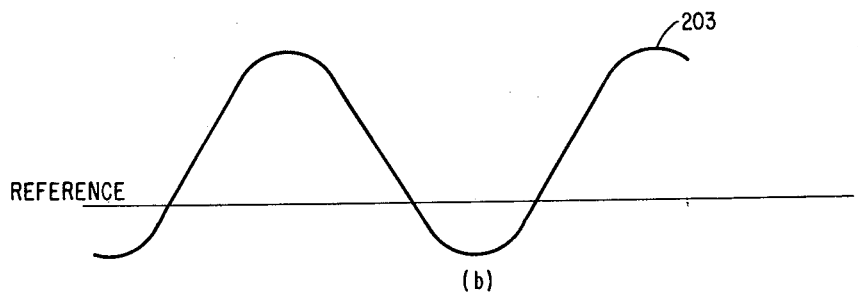
(b)
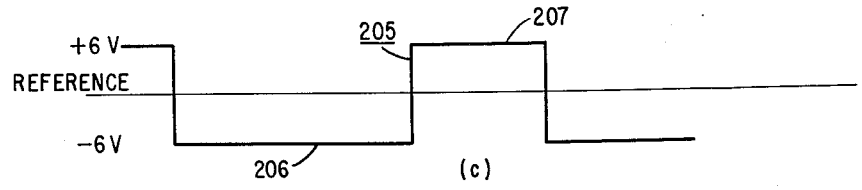
(c)

United States Patent Office 3,078,725
Patented Feb. 26, 1963

3,078,725
ACCELERATION MEASURING MEANS
Le Roy S. Jimerson, Jr., Newark Valley, and Robert A. Watson, Endicott, N.Y., assignors to International Business Machines Corporation, New York, N.Y., a corporation of New York
Filed Dec. 31, 1959, Ser. No. 863,205
9 Claims. (Cl. 73—517)

This invention relates to improvements in means of determining the output of a captured mass accelerometer in a form which can be directly used by digital data processing equipment.

Accelerometers have wide application in the control system arts in the measurement of the linear acceleration of a body in motion. One of the known means for measuring the linear acceleration of a mechanical body or vehicle (such as an aircraft) is a captured mass accelerometer, for example, a pendulous accelerometer. This invention, however, relates to any captured or proof mass accelerometer, and could be used with a spirit level if torquing means are provided. The pendulous accelerometer conventionally comprises a mass suspended by a lever at a determined distance from a shaft rotatable about a driven axis which is, in turn, an integral part of the mechanical body, the linear acceleration of which is to be measured. If the acceleration to be measured is to be other than gravity, the pivot axis is mounted on a stabilized platform. Moreover, the mass may be immersed in a viscous fluid so as to minimize non-linear friction known as stiction and introducing viscous damping. Thus, if the last is subjected to a linear acceleration in a plane which is perpendicular to the earth's gravity vector $g$, the mass will move to make a particular angle with respect to its neutral position in accordance with a function of the linear acceleration being measured. When the mass is not subjected to any acceleration, then no force is exerted which would tend to move it away from its neutral position.

Since the relationship between the angular movement of the mass and the acceleration desired to be measured may be relatively hard to measure with great accuracy, a technique exists in the prior art for the purpose of avoiding this problem. This technique may be exemplified by connecting a microsyn-type generator, or some equivalent, to the shaft about the pivot axis, referred to above, to be rotated by an angular amount proportional to the angular displacement of the mass, with the output of the generator being amplified and/or modified to supply an output current in accordance therewith to a D.C. torquer device, such as a D'Arsonual torquer or a speaker voice coil. This D.C. torquer device which may be connected to the shaft, then torques the pendulum in a direction opposite to its initial movement so that the pendulum tends to return toward its neutral position. The current being applied to the D.C. torquer to maintain the pendulum near its neutral position is proportional to and provides a measure of the linear acceleration (plus any component of gravity along the input axis if the pivot axis is not mounted on the stabilized platform) acting on the pendulum.

The output current usually provided by such a pendulous accelerometer, which is supplied to the D.C. torquer, is analog in nature, since its polarity indicates the direction of acceleration, and its magnitude indicates the magnitude of acceleration. Therefore, further conversion equipment is required for this current to be utilized in digital-type devices. For example, if it is desired to obtain a digital representation of the acceleration or of the velocity over a particular period of time, then some analog-to-digital converter must be utilized which is responsive to both magnitude and polarity.

In the present invention, a different kind of analog signal for driving the D.C. torquer is produced. It is in the form of a square wave whose positive and negative portions vary in time duration according to the acceleration, but whose magnitudes are essentially equal. Thus a small oscillatory motion is imparted to the pendulum as it is returned to its neutral position. A square wave error signal is preferable to a D.C. signal in an analog loop or pulses proportional to acceleration in other digital loops because a square wave provides the same average power to the accelerometer restoring coil regardless of the acceleration level. This is as contrasted to a D.C. analog error signal or pulse type error signals which provide power to the restoring coil at a level proportional to the acceleration level. In this case, the heat generated in the restoring coil is proportional to acceleration and the accuracy of the device becomes poor at large acceleration levels. The square wave can also be applied to a digitizer responsive to the difference in the time durations of the negative and positive portions.

It is therefore an object of the present invention to provide a pendulous accelerometer system utilizing a square wave signal with positive and negative portions for driving a D.C. torquer.

Another object of the invention is to provide a system for measuring acceleration comprising first means movable from a neutral position in accordance with a function of acceleration to be measured, second means responsive to said first means for generating a control signal representing said function of acceleration, third means for combining said control signal with a reference signal of constant periodicity so as to produce an error signal representing said function of acceleration, and fourth means responsive to said error signal for moving said first means back to its neutral position.

A yet further object of the invention is to provide a scale factor circuit responsive to the square wave.

Another object of the invention is to provide means for generating a square wave signal whose positive and negative portions have substantially the same forcing effect on the captured mass, but whose time durations may be unequal.

Other objects of the invention will be pointed out in the following description and claims and illustrated in the accompanying drawings, which disclose, by way of example, the principle of the invention and the best mode which has been contemplated of applying that principle.

In the drawings:

FIGURE 2 shows certain input and output signal wave forms which are generated by the system of FIGURE 1.

Figure 1:
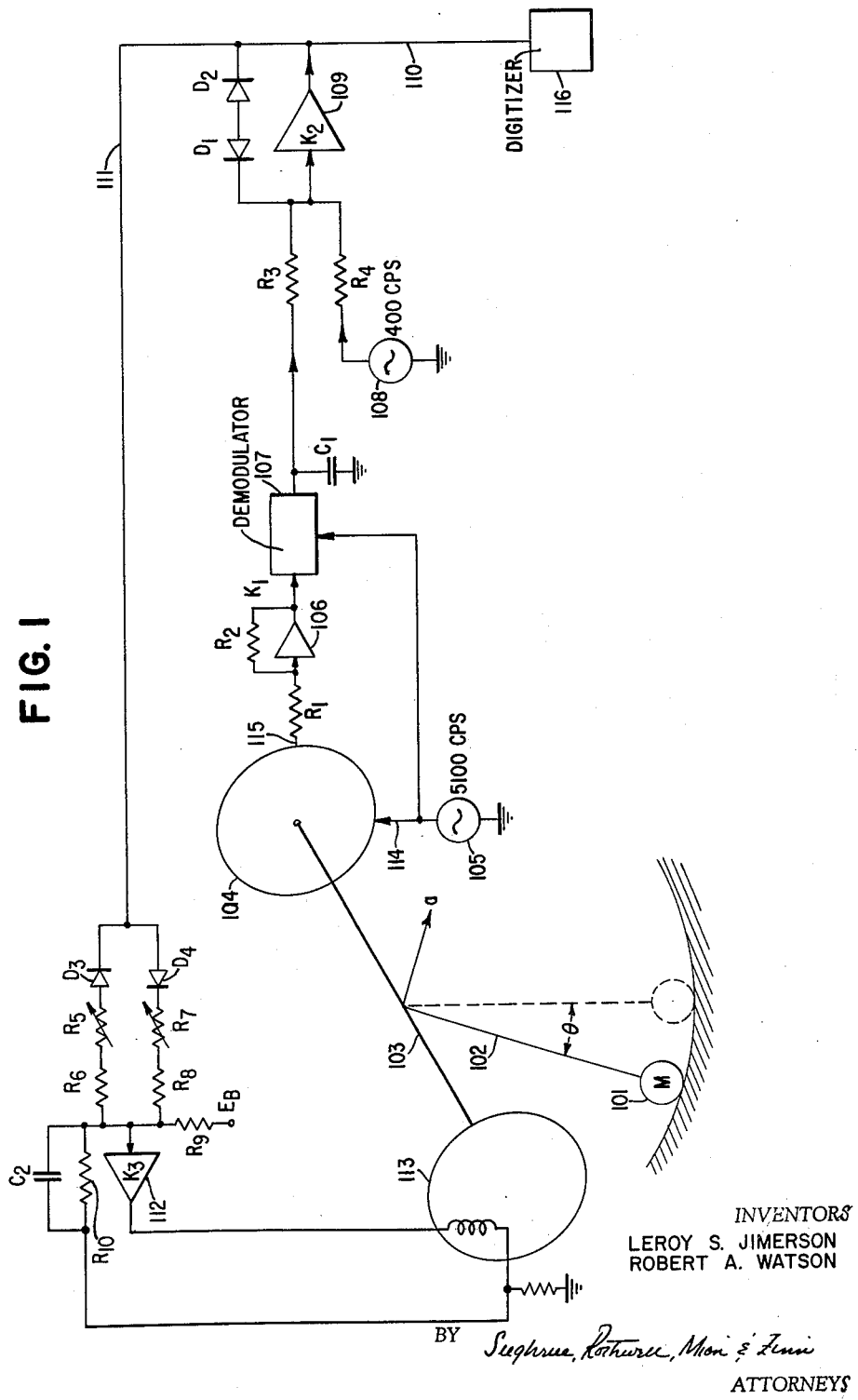
FIGURE 1 is a diagram of a pendulous accelerometer measuring system in accordance with the present invention.

Referring now to FIGURE 1, there is shown a pendulum 102 having a mass 101 which is affixed to a shaft 103 orientated about a pivot axis which may be integral with the mechanical body or vehicle (not shown), the acceleration of which is to be measured. Furthermore, if it is desired that the acceleration measured be the linear acceleration of the mechanical body other than the acceleration of gravity, the mechanical body may comprise a stabilized platform such as is often used in inertial guided systems. Pendulum 102 is shown both in its neutral position (in dotted lines) representing a zero acceleration, and at a position angularly displaced by an angle $\theta$ from its initial position in accordance with a function of the linear acceleration $(a)$ being measured.

Since the relationship, between the angular movement of pendulum 102 and the acceleration which is desired to be measured, is non-linear and relatively hard to measure with great accuracy, further means are utilized to minimize the displacement of the pendulum 102 during the measurement. This technique may be exemplified by connecting a rotatable voltage generating means 104 to shaft 103 so that a voltage will be generated which is commensurate in polarity and magnitude (or phase and magnitude) with the direction and magnitude of the angular displacement of pendulum 102. Such a voltage generating means may comprise the well known microsyn-type generator or any of its well known equivalents in order to provide either an alternating current or a direct current output voltage in accordance with the particular circuit techniques utilized. The voltage generating means 104 in FIGURE 1 is taken to be a microsyn generator with an input terminal 114 and an output terminal 115. Input terminal 114 functions to energize the microsyn from a alternating current source 105 which may be 5,100 cycles per second for purposes of the present preferred embodiment of the invention. Output terminal 115 provides an alternating current voltage output commensurate with the instantaneous angular displacement $\theta$ of shaft 103 from its neutral position. As shown, output terminal 115 is utilized to energize a conventional phase sensitive demodulator (e.g., a chopper) 107 through a conventional amplifier 106. Demodulator 107 is energized by the alternating current supply source 105, and its output may be filtered by capacitor $C_1$. The filtered output voltage from demodulator 107 is then of a polarity and magnitude commensurate with the direction and magnitude of the angular displacement $\theta$ of pendulum 102 with respect to its initial neutral position. It therefore approximately is a measure of the linear acceleration acting on the pendulum. As indicated hereinabove, conventional voltage generating means 104 may be either of the alternating current or the direct current type. Obviously, if it has a direct current output, the demodulator and filtering stage just described would be unnecessary.

In the prior art, the output voltage from demodulator 107 is often directly connected to the D.C. torquer 113 which responds to its polarity and magnitude by forcing pendulum 102 back to its neutral position. Furthermore, the demodulator current is also very often directed to an analog-to-digital converter for obtaining a digital representation of the acceleration. However, in the present invention, the D.C. voltage from 107 is directed through a summing resistor $R_3$ so as to be mixed with and added to a precise A.C. voltage from source 108 which is fed through summing resistor $R_4$. For purposes of the present embodiment, this A.C. voltage from source 108 may be 400 cycles per second or some other frequency which is not harmonically related to the frequency of generator 105. The sum of these two voltages is then fed to the input of an inverting high gain direct coupled amplifier 109 having a feedback loop comprising a pair of Zener diodes $D_1$ and $D_2$ which are serially connected back-to-back. Each of these Zener diodes will break down at approximately six volts when a potential is applied so as to bias it in the reverse direction. As before mentioned, the gain of amplifier 109 is quite high, on the order of 1,000 or more, at the frequency of source 108.

The use of a sine wave as a reference as indicated by the source 105 may sometimes be undesirable since the circuit loop gain becomes effectively changed as a function of accelerometer pick-off magnitude. This is caused by the curvature of a sinusoidal reference source. A sawtooth or triangular wave shape reference voltage may be more desirable. Further, the accuracy of this system is dependent upon the accurate detection of the zero crossures of the combined reference and demodulator signal. In order to detect these crossures accurately, two parallel Schmidt triggers may be connected to the output of demodulator 107. One of these Schmidt triggers responds to a positive going zero crossing and the other responds to a negative going zero crossing. Two latches are set and reset by the output of these Schmidt triggers. When one Schmidt trigger is fired, one of the latches is set and the other is reset. When the other Schmidt trigger is fired, the other latch is set and the first latch is reset. Thus, the output of the latches is a high quality square wave in which the durations of the positive and negative portions accurately represent the magnitude of acceleration.

Referring now to FIGURE 2(a), it is assumed for purposes of the present description that the polarity and approximate magnitude of the D.C. signal applied to summing resistor $R_3$ is that indicated by horizontal line 201 which corresponds to a particular acceleration. Furthermore, the A.C. signal from source 108 which is applied to summing resistor $R_4$ is indicated by sine wave 202. The resultant sum of these two signals 201 and 202 is shown by sine wave 203 in FIGURE 2(b). This is the signal applied to the input of amplifier 109. The vertical position of A.C. signal 202 with respect to the reference potential line, which may be zero, is governed by the magnitude and polarity of D.C. signal 201 emanating from demodulator 107. Thus, in FIGURE 2(b), it is seen that signal 202 has been shifted upwards, with respect to the reference line, by an amount equal to the magnitude of signal 201 so that the resultant signal 203 is no longer symmetrical about the reference line. Conversely, if the polarity of signal 201 of the demodulator 107 is negative, then A.C. voltage 202 would be shifted negative with respect to the reference line.

Amplifier 109 has no feedback during the time when the input signal 203 thereto is approximately at reference potential. One of the diodes $D_1$ or $D_2$ is biased in a reverse direction no matter what the polarity of the input signal. However, if the potential between the input and output of amplifier 109 has not reached the Zener breakdown voltage, it is essentially an open circuit element which removes the feedback loop from the circuit and therefore does not appreciably affect the high gain of the amplifier. When the input signal 203 increases to such an extent that the high amplifier gain causes the potential across this reverse biased diode to reach the Zener voltage, which in the present embodiment is approximately six volts, then break down of the diode occurs and its resistance decreases to a very low value. Since the other diode is at this time biased in the forward direction, the total resistance of the feedback loop is quite small and effectively feeds back the entire output signal to the input. Before Zener breakdown occurs, the gain of the amplifier is $K_2$, while after breakdown, the incremental gain of the amplifier is approximately zero. Therefore, the output voltage from amplifier 109 remains essentially constant at the Zener voltage of six volts above or below the reference potential no matter how great the magnitude of the input signal thereto. Conversely, for the opposite polarity of input signal 203, the other diode is reverse biased and will break down upon application of a very small input signal so as to maintain the output of amplifier 109 at the Zener voltage of six volts.

Referring now to FIGURE 2(c), the output signal generally indicated by 205 from amplifier 109 is shown, which is derived from an input signal corresponding to wave form 203 in FIGURE 2b. For an amplifier 109 having a gain $K_2$ of 1,000 then a magnitude of +6 millivolts at the input will cause an output signal 206 of −6 volts. Amplifier 109 typically inverts the input signal. Therefore, diode $D_1$, which is reverse biased at this time due to its cathode being higher in potential than its anode, has across it a potential of approximately six volts. Diode $D_2$, however, is forward biased at this time since its anode is greater in potential than its cathode. When the potential of six volts is applied across diode $D_1$, it breaks down thus reducing the incremental gain of amplifier 109 to approximately zero. Although input signal 203 increases in positive magnitude, the output from amplifier 109 is maintained at the −6 volt value for nearly all the duration of the positive swing. Upon input signal 203 again approaching ground potential and reversing in polarity, a very small negative input signal of −6 millivolts will cause diode $D_2$ to break down which maintains a +6 volt signal 207 from amplifier 109 for the duration of the negative swing of the input. By using an amplifier of almost infinite gain, then only an infinitesimally small signal input with respect to the reference point is required to obtain the constant signal output.

It can therefore be seen that the magnitude of the D.C. voltage 201 obtained from demodulator 107 will determine the duration of the positive and negative signals 207 and 206, respectively, within each cycle whose period is determined by the frequency of source 108. For example, when signal 201 is positive, then the negative portion 206 of signal 205 will be greater in duration within the cycle than the positive portion 207. If no acceleration is experienced by the accelerometer, then no D.C. signal is produced by demodulator 107 with respect to the reference potential. Therefore, signal 108 would not be shifted and the positive and negative portions of output signal 205 would be equal in duration.

The output of amplifier 109 may be filtered and applied, by way of a direct coupled current amplifier 112, to the D.C. torquer 113 in order to drive pendulum 102 back to its neutral position shown by the dotted line in FIGURE 1. For one polarity signal from amplifier 109, torquer 113 will rotate shaft 103 in one direction, while for the opposite polarity torquer 113 will rotate shaft 103 in the opposite direction. With no signal output from demodulator 107, the output from amplifier 109 spends equal time at +6 volts and −6 volts, thereby resulting in a net zero current to torquer 113 for the complete cycle since the current amplifier 112 filters the A.C. component of the signal to essentially zero volts. However, if the durations of the positive and negative portions of the signal 205 during the cycle are different, the signal 205 has a net D.C. component, which causes a D.C. current to flow in the torquer 113 in a direction such as to tend to rotate shaft 103 toward its neutral position. When the torque applied by the torquer 113 equals the torque caused by the acceleration force, the movement of the pendulum 101 will stop. It is evident, therefore, that the D.C. current applied to the torquer must be directly proportional to the acceleration being sensed by the pendulum 101. As previously explained, this D.C. current is also directly related to the difference in time between the duration of the positive and negative portions of signal 205 during a cycle of the frequency generated by generator 108.

The output signal from amplifier 109, with its positive and negative portions, may be applied through lead 110 to a digitizing system 116 such as is provided in application Serial No. 742,256, filed June 15, 1958, now U.S. Patent 2,979,960, issued April 18, 1961, and assigned to the assignee of the instant application. The digitizer shown in the above-identified application provides a convenient and simple way to indicate in digital notation the acceleration and/or velocity over a period of time. It is responsive to a wave form such as is shown in FIGURE 2(c) of the instant application in order to measure the time difference between negative and positive durations of a step voltage.

If the Zener breakdown voltages of diodes $D_1$ and $D_2$ were identical, then the output from amplifier 109 might be applied directly to amplifier 112 which provides current to torquer 113. In practice, however, a perfect match of diodes $D_1$ and $D_2$ is probably not realizable, so that the magnitude of the positive and negative signal portions would not be equal. This would result in unequal amounts of current being supplied to the torquer even though the time durations of positive and negative signal portions are equal. Furthermore, torquer 113 may also exhibit non-linear characteristics in that it may move pendulum 102 through unequal distances in opposite directions for equal amounts of positive and negative current. In order to compensate for these and other undesirable effects, an individual scale factor circuit is provided for each positive and negative portion of signal 205. This circuit consists of disconnect diodes $D_3$ and $D_4$, together with resistors $R_5$, $R_6$ and $R_7$, $R_8$, respectively. A bias resistor $R_9$ is also connected in circuit whose value is characteristic of the mechanism of the accelerometer. A positive output from amplifier 109 will pass through diode $D_4$, while diode $D_3$ passes the negative portion. Variable resistors $R_5$ and $R_7$ are adjusted until the net torque supplied by torquer 113 is zero for positive and negative signal portions having equal time durations. These resistors thereby control the balance of the electronics circuit.

Another practical engineering consideration may dictate the use of additional circuitry associated with amplifier 112 so as to insure the accurate response of torquer 113 to an output signal therefrom. If a square wave input is applied to the torquer the losses in the magnetic core of the torquer due to the high frequency components in the square wave may be quite high. Therefore, a smoothing circuit consisting of capacitor $C_2$ and resistor $R_{10}$ is connected in parallel with amplifier 112 so as to eliminate the fast rise and fall times of the output of amplifier 109. Since the smoothing circuit operates to the same extent for both positive and negative signal portions, it does not affect the net response of the torquer which is dependent upon the difference between these portions.

Although the invention has been described with reference to a preferred embodiment, it will be understood that many modifications and changes therein will occur to those skilled in the art without departing from the spirit of the invention. Accordingly, the scope of the invention is not intended to be limited except as defined by the following claims.

What is claimed is:

1. A system for measuring acceleration comprising first means movable from a neutral position in accordance with a function of acceleration to be measured, a generator connected to said first means for generating a D.C. control signal representing said function of acceleration, a reference signal source of constant periodicity, third means for combining said control signal with said reference signal of constant periodicity so as to produce a square wave error signal representing said function of acceleration, and fourth means responsive to said error signal for moving said first means back to its neutral position.

2. A system according to claim 1 in which said reference signal is A.C.

3. A system according to claim 2 in which the time durations of the positive and negative portions of said square wave error signal are different.

4. A system for measuring acceleration comprising first means movable from a neutral position in accordance with a function of acceleration to be measured, a generator connected to said movable means for generating a D.C. control signal representing said function of acceleration, an A.C. reference signal source, third means for combining said D.C. control signal with said A.C. reference signal so as to produce an A.C. square wave error signal, scale factor means, said A.C. square wave error signal being connected to said scale factor means, the output of said scale factor means being a modified error signal the positive and negative portions of which are selectively changed, and fifth means responsive to said modified error signal for moving said first means back to its neutral position.

5. A system according to claim 4 in which said third means includes means for summing together said control signal and said reference signal, and amplifier means responsive to the sum of said signals for producing said square wave error signal.

6. A system according to claim 5 in which said amplifier means has high gain and further includes means for maintaining its output at either of two constant levels in response to the polarity of said sum.

7. A system according to claim 5 in which said amplifier means has high gain and further includes a feedback circuit comprising two semiconductor diodes serially connected in back-to-back relationship.

8. A system according to claim 4 in which said scale factor means further includes smoothing means for eliminating the sharp leading and trailing edges of said square wave error signal.

9. A system for measuring acceleration comprising first means movable from a neutral position in accordance with the function of acceleration to be measured, second means responsive to said first means for generating a D.C. control signal representing said function of acceleration, an A.C. reference signal source of constant periodicity, third means for combining said control signal with said reference signal of constant periodicity to produce an error signal representing said function of acceleration, said error signal being A.C. and having different durations of positive and negative portions of said A.C. signal, and fourth means responsive to the positive portion of said error signal for moving said first means in one direction and responsive to the negative portion of said error signal for moving said first means in an opposite direction.

References Cited in the file of this patent

UNITED STATES PATENTS

| | | |
|---|---|---|
| 2,215,777 | Benz | Sept. 24, 1940 |
| 2,789,254 | Bodle | Apr. 16, 1957 |
| 2,853,287 | Draper et al. | Sept. 23, 1958 |
| 2,933,299 | Bouvier | Apr. 19, 1960 |
| 2,940,306 | Lozier | June 14, 1960 |
| 2,943,493 | Ten Bosch | July 5, 1960 |
| 2,947,883 | Welch | Aug. 2, 1960 |
| 2,964,650 | Radcliffe | Dec. 13, 1960 |

OTHER REFERENCES

Book: Electric Analog Computers by Korn and Korn, McGraw-Hill, 1956, pages 292, 298 and 299.